(12) United States Patent
Gaigler et al.

(10) Patent No.: US 11,148,390 B2
(45) Date of Patent: Oct. 19, 2021

(54) MULTIPLE LAYER HOLLOW CYLINDER AND METHOD OF MAKING

(71) Applicant: Lockheed Martin Corporation, Bethesda, MD (US)

(72) Inventors: Randy L. Gaigler, Parkville, MD (US); Matthew B. Ascari, Warrenton, VA (US); David C. Briggs, Edgewood, MD (US); Anthony J. Pellegrino, Bel Air, MD (US); James A. Waicukauski, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1062 days.

(21) Appl. No.: 15/347,220

(22) Filed: Nov. 9, 2016

(65) Prior Publication Data

US 2018/0126689 A1 May 10, 2018

(51) Int. Cl.
*B32B 27/06* (2006.01)
*B32B 5/02* (2006.01)
(Continued)

(52) U.S. Cl.
CPC .............. *B32B 5/02* (2013.01); *B29C 53/582* (2013.01); *B29C 53/607* (2013.01); *B29C 53/68* (2013.01);
(Continued)

(58) Field of Classification Search
CPC ........................ Y02E 10/34; B29C 53/56–845
(Continued)

(56) References Cited

U.S. PATENT DOCUMENTS 3,026,223 A * 3/1962 Gessler .................. B29C 70/00
138/141
3,340,115 A 9/1967 Rubenstein
(Continued)

OTHER PUBLICATIONS

International Search Report and Written Opinion for International Patent Application No. PCT/US2017/060789, dated Jan. 12, 2018, 12 pages.
(Continued)

*Primary Examiner* — Lee E Sanderson
*Assistant Examiner* — Michael C Romanowski
(74) *Attorney, Agent, or Firm* — Withrow & Terranova, PLLC

(57) ABSTRACT

A multiple layer hollow cylinder is provided. An inner air-tight material is wrapped about at least a portion of a mandrel to form a plurality of first material loops. Each first material loop subsequent to an initial first material loop at least partially overlaps a previous first material loop. A resin-infused fabric material is wrapped over the inner air-tight material to form a plurality of second material loops. Each second material loop subsequent to an initial second material loop at least partially overlaps a previous second material loop. An outer air-tight transparent material is wrapped over the resin-infused fabric material to form a plurality of third material loops. Each third material loop subsequent to an initial third material loop at least partially overlaps a previous third material loop. Energy is directed about the outer air-tight transparent material to cure the resin-infused fabric material to form a hollow cylinder.

13 Claims, 7 Drawing Sheets

(51) Int. Cl.
  *B29C 53/58*    (2006.01)
  *B29C 53/80*    (2006.01)
  *B29C 53/82*    (2006.01)
  *B29C 53/68*    (2006.01)
  *B29C 53/60*    (2006.01)
  *B32B 37/14*    (2006.01)
  *B29L 23/00*    (2006.01)

(52) U.S. Cl.
  CPC .............. *B32B 27/06* (2013.01); *B32B 37/14* (2013.01); *B29L 2023/225* (2013.01); *B32B 2305/72* (2013.01); *B32B 2310/0806* (2013.01); *Y02E 10/30* (2013.01)

(58) Field of Classification Search
  USPC ......................................................... 138/144
  See application file for complete search history.

(56) References Cited

U.S. PATENT DOCUMENTS

| | | | | |
|---|---|---|---|---|
| 3,522,122 | A * | 7/1970 | De Ganahl | B29C 53/8058 156/171 |
| 3,700,519 | A * | 10/1972 | Carter | B29C 53/60 138/172 |
| 4,013,494 | A | 3/1977 | Patterson | |
| 4,116,009 | A * | 9/1978 | Daubin | F03G 7/05 114/264 |
| 4,147,454 | A * | 4/1979 | Willums | B29C 53/607 156/430 |
| 4,212,329 | A * | 7/1980 | Horton | F03G 7/05 138/155 |
| 5,043,033 | A | 8/1991 | Fyfe | |
| 5,242,517 | A | 9/1993 | Endoh | |
| 5,300,391 | A | 4/1994 | Fabian et al. | |
| 5,599,599 | A | 2/1997 | Mirmiran et al. | |
| 5,828,003 | A | 10/1998 | Thomeer et al. | |
| 6,048,428 | A | 4/2000 | Millward et al. | |
| 6,123,485 | A | 9/2000 | Mirmiran et al. | |
| 6,189,286 | B1 | 2/2001 | Seible et al. | |
| 6,219,991 | B1 | 4/2001 | Salek-Nejad | |
| 7,882,703 | B2 * | 2/2011 | Pellen | F16L 9/18 60/641.7 |
| 2004/0175521 | A1 * | 9/2004 | Nakamura | B29C 35/0888 428/35.2 |
| 2005/0277062 | A1 * | 12/2005 | McLean | B41C 1/182 430/311 |
| 2011/0036490 | A1 | 2/2011 | Mamish | |
| 2012/0048455 | A1 * | 3/2012 | Rocher | B29C 53/581 156/190 |
| 2013/0087241 | A1 * | 4/2013 | Lelarge | F16L 9/128 138/155 |
| 2013/0098559 | A1 * | 4/2013 | Lelarge | B29C 53/74 156/379 |
| 2013/0284037 | A1 * | 10/2013 | Rossini | B41F 27/105 101/216 |
| 2018/0186102 | A1 * | 7/2018 | Barrett | F16L 1/038 |

OTHER PUBLICATIONS

International Preliminary Report on Patentability for International Patent Application No. PCT/US2017/060789, dated May 23, 2019, 9 pages.

* cited by examiner

MULTIPLE LAYER HOLLOW CYLINDER AND METHOD OF MAKING

TECHNICAL FIELD

The embodiments relate generally to hollow cylinders generated from multiple layers of materials for use, for example, as a pipe or a support structure.

BACKGROUND

Hollow cylinders may be used as pipes to transport fluids, as support structures, as a combination of the two, and for other purposes. Certain applications benefit from non-segmented extended length hollow cylinders, such as a hollow cylinder hundreds of meters in length or longer. One such application is a cold water pipe (CWP) used in Ocean Thermal Energy Conversion (OTEC) technology. A CWP may be 1,000 meters in length and have a diameter of 4 meters, or greater. A CWP is typically assembled in a vertical orientation from a floating platform and extended into the ocean as the CWP is manufactured. During assembly, the CWP is rigidly coupled to a floating ocean platform. A CWP can take up to four months to assemble. The CWP must be designed to withstand the ocean environmental extremes that may occur during the manufacturing process. These extreme environmental design conditions are selected based on the deployment time of the CWP. The driving ocean environmental conditions are wave height, wave period, wind speed, and ocean current. After the CWP is operational and in place under the surface of the water, the coupling of the CWP to the platform is no longer rigid, and the environmental forces the CWP will be subjected to are diminished. Thus, a CWP is built to withstand larger forces that won't be encountered when in operation solely because of the length of time it takes to manufacture the CWP. It would be desirable if a CWP could be manufactured in less time, such as 30 days, which would minimize the environmental design conditions (e.g., wave height, wave period, wind speed, and ocean current) used for the design of the CWP.

SUMMARY

The embodiments relate generally to hollow cylinders generated from multiple layers of materials for use, for example, as a pipe or a support structure. The embodiments facilitate the generation of a hollow cylinder of any length and, in some embodiments, the in-place generation of a cold water pipe at a deep water platform in a relatively short time frame.

In one embodiment a method of making a hollow cylinder is provided. The method includes wrapping an inner air-tight material about at least a portion of a mandrel to form a plurality of first material loops, each first material loop subsequent to an initial first material loop at least partially overlapping a previous first material loop. The method further includes wrapping a first resin-infused fabric material over the inner air-tight material to form a plurality of second material loops, each second material loop subsequent to an initial second material loop at least partially overlapping a previous second material loop. The method further includes wrapping an outer air-tight transparent material over the first resin-infused fabric material to form a plurality of third material loops, each third material loop subsequent to an initial third material loop at least partially overlapping a previous third material loop. The method further includes directing energy about the outer air-tight transparent material to cure the first resin-infused fabric material to form a cylinder portion of the hollow cylinder.

In another embodiment a hollow cylinder is provided. The hollow cylinder includes an inner air-tight material that forms a void having a circular cross-section, a first opening at a first end of the hollow cylinder, and a second opening at a second end of the hollow cylinder. The hollow cylinder also includes a cured first resin-infused fabric material wrapped about the inner air-tight material. The hollow cylinder also includes an outer air-tight transparent material wrapped about the cured first resin-infused fabric material.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first material loops" and "second material loops," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

The embodiments relate to generally to hollow cylinders generated from multiple layers of materials for use, for example, as a pipe or a support structure. The embodiments facilitate the generation of a hollow cylinder of any length, and, in some embodiments, the in-place generation of a cold water pipe (CWP) at a deep water platform in a relatively short time frame. While for purposes of illustration the embodiments will be discussed in the context of a CWP in an ocean thermal energy conversion (OTEC) application, the embodiments are not limited to a CWP, or indeed, to a pipe at all, and also have applicability in the generation of support structures. For example, the embodiments facilitate the generation of an extended length support structure that supports a wind turbine in water or on land, or a bridge column. Again, these are merely examples, and the embodiments have applicability to any application that benefits from a hollow cylinder and, in particular, to applications that would benefit from an extended length, non-segmented hollow cylinder.

Figure 1:
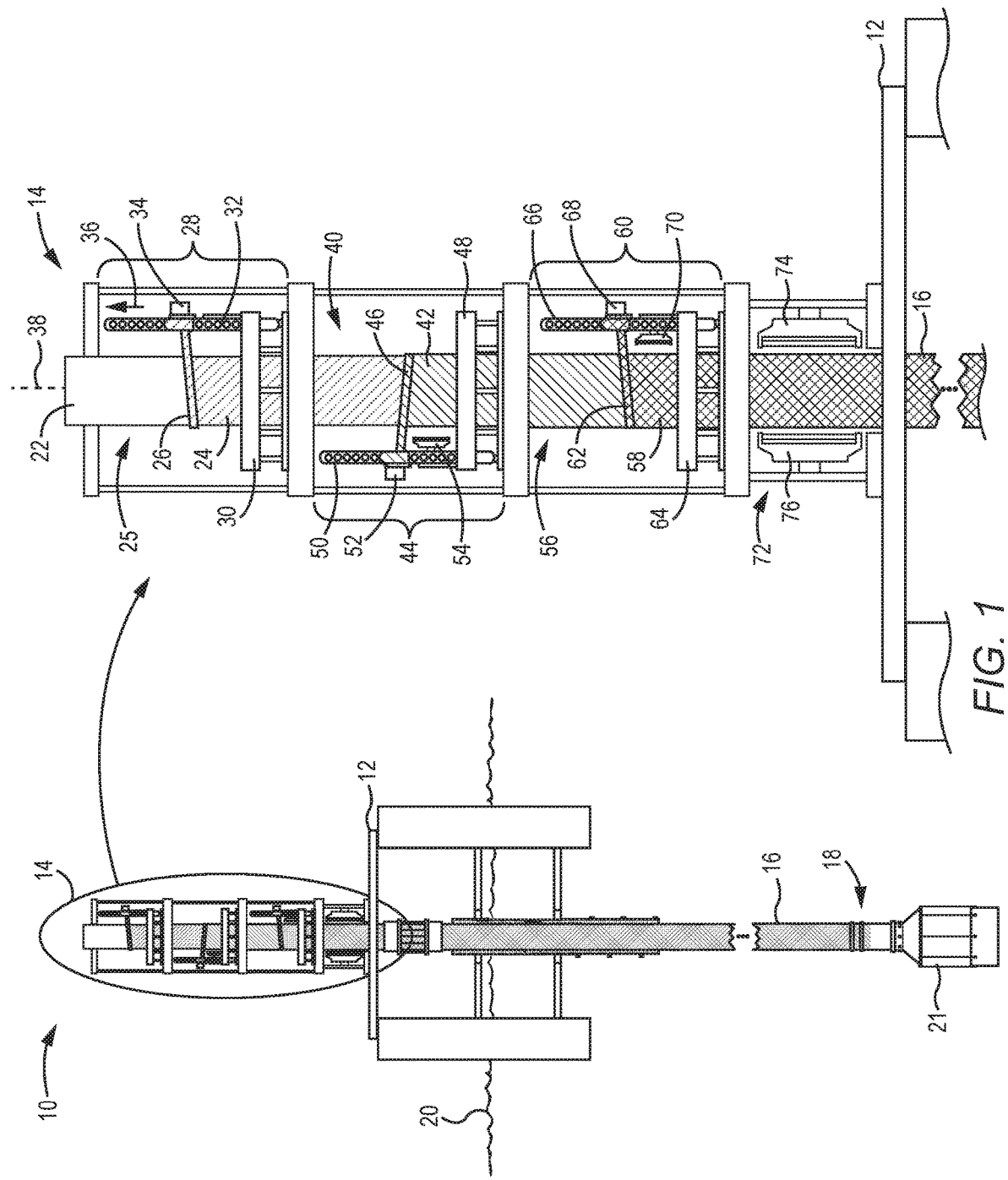
FIG. 1 is a diagram of an environment that includes the deep water platform and a mechanism for generating a multiple layer hollow cylinder according to one embodiment.

FIG. 1 is a diagram of an environment 10 that includes a deep water platform 12 and a mechanism 14 for generating a multiple layer hollow cylinder 16 according to one embodiment. The hollow cylinder 16 comprises a CWP that is generated using a continuous production mechanism, the leading end 18 of which extends deeper and deeper below the surface of the water 20 as the hollow cylinder 16 is generated. In some embodiments, the leading end 18 may be coupled to a clump weight 21 that puts the hollow cylinder 16 under tension and helps pull the leading end 18 toward the ocean floor. In some embodiments, the hollow cylinder 16 is generated to a 1,000 meter length and may have a diameter between about 4 meters and 10 meters.

The mechanism 14 includes a mandrel 22 about which the hollow cylinder 16 is generated. The mandrel 22 may be fixed such that the mandrel does not rotate or move, other than movement in conjunction with the platform 12. In one embodiment, the mandrel 22 has an exterior surface with low surface energy, such as polished chrome-plated steel, to facilitate movement of the hollow cylinder 16 with respect to the mandrel 22, as described in greater detail below. In some embodiments, the mandrel 22 may be collapsible. The mandrel 22 may be chrome plated with a non-stick coating that results in coefficients of both static and kinetic friction below 0.1.

Generally, the embodiments generate the hollow cylinder 16 by wrapping layers of materials over one another to form a cylinder portion about the mandrel 22, while either continuously or iteratively sliding the cylinder portion down and off the mandrel 22 to allow additional continuous cylinder portions to be continuously generated about the mandrel 22 until the hollow cylinder 16 is a desired length.

In the example illustrated in FIG. 1, the hollow cylinder 16 comprises three layers of materials. A first layer comprises an inner air-tight material 24 that is transparent to ultraviolet (UV) energy, does not degrade due to UV energy, and has a low coefficient of friction to enable the inner air-tight material 24 to slide with respect to the mandrel 22 relatively easily. In one example, the inner air-tight material 24 comprises a clear polyurethane plastic film that is transparent to ultraviolet energy having wavelengths between about 380 nanometers and about 410 nanometers. In one example, at a first stage 25 of the mechanism 14, the inner air-tight material 24 is helically wrapped about a portion of the mandrel 22 to form a plurality of first material loops 26, each first material loop 26 after the initial first material loop 26 overlapping a previous first material loop 26. In some embodiments, a first wrapping mechanism 28 wraps the inner air-tight material 24 about the portion of the mandrel 22. The first wrapping mechanism 28 includes a guide 30 and a vertical structure 32 movably coupled to the guide 30 to facilitate movement of the vertical structure 32 completely about the mandrel 22. As the vertical structure 32 moves about the mandrel 22, a first material dispenser 34 dispenses the inner air-tight material 24 while concurrently moving in a rotational direction about the mandrel 22 in conjunction with the vertical structure 32 and in a second direction, in this example an upward direction 36, parallel to a longitudinal axis 38 of the mandrel 22.

At a second stage 40 of the mechanism 14, a second layer comprising a first resin-infused fabric material 42 is helically wrapped over the inner air-tight material 24. In one example, the first resin-infused fabric material 42 comprises Stitch-bonded Fiberglass Fabric (PPG HYBON 2026 XM), manufactured by Saertex USA, Huntsville, N.C. The first resin-infused fabric material 42 is infused with a resin. In one example, the resin comprises 7300 LV M3 UV Resin, manufactured by Sunrez Corporation, El Cajon, Calif. The resin has a viscosity suitable for wet layup, infusion, and filament winding. In one example, the first resin-infused fabric material 42 may be pre-impregnated with the resin. In another example, fabric material may be impregnated with resin as the first resin-infused fabric material 42 is being wrapped over the inner air-tight material 24. A second wrapping mechanism 44 wraps the first resin-infused fabric material 42 over the inner air-tight material 24 to form a plurality of second material loops 46, each second material loop 46 after the initial second material loop 46 overlapping a previous second material loop 46. The second wrapping mechanism 44 includes a guide 48 and a vertical structure 50 movably coupled to the guide 48 to facilitate movement of the vertical structure 50 completely about the mandrel 22. As the vertical structure 50 moves about the mandrel 22, a second material dispenser 52 dispenses the first resin-infused fabric material 42 while concurrently moving in a rotational direction about the mandrel 22 in conjunction with the vertical structure 50 and in the upward direction 36, parallel to the longitudinal axis 38 of the mandrel 22.

The second stage 40 includes an energy source 54, such as a UV light, that emits electromagnetic radiation toward the first resin-infused fabric material 42 to at least partially cure the first resin-infused fabric material 42. In one embodiment, the energy source 54 is either directly coupled to the guide 48 and moves about the mandrel 22, or is coupled to the vertical structure 50 and moves about the mandrel 22 in conjunction with the vertical structure 50. The energy emitted by the energy source 54 may comprise any suitable wavelengths and power sufficient to at least partially cure the first resin-infused fabric material 42. In some embodiments, the energy source 54 emits energy in a wavelength within the range of about 380-410 nanometers. The energy source 54 may not entirely cure the first resin-infused fabric material 42, but at least partially cures the first resin-infused fabric material 42.

At a third stage 56 of the mechanism 14, a third layer comprising an outer air-tight transparent material 58 is helically wrapped over the first resin-infused fabric material 42. The outer air-tight transparent material 58 is transparent to and does not degrade due to UV energy. In some embodiments, the outer air-tight transparent material 58 comprises a polyurethane film. The polyurethane film may have embedded features that promote adhesion to the CWP structural material (e.g., fabric), such as, by way of non-limiting example, chopped strain fiberglass, woven fiberglass, and a cloth material, or polyester. The polyurethane film has an inherent low coefficient of static and kinetic friction and, combined with low surface energy on a sliding face of the mandrel 22, will enable smooth extraction and extension of the CWP with respect to the mandrel 22. A third wrapping mechanism 60 wraps the outer air-tight transparent material 58 over the first resin-infused fabric material 42 to form a plurality of third material loops 62, each third material loop 62 after the initial third material loop 62 overlapping a previous third material loop 62. The third wrapping mechanism 60 includes a guide 64 and a vertical structure 66 movably coupled to the guide 64 to facilitate movement of the vertical structure 66 completely about the mandrel 22. As the vertical structure 66 moves about the mandrel 22, a third material dispenser 68 dispenses outer air-tight transparent material 58 while concurrently moving in a rotational direction about the mandrel 22 in conjunction with the vertical structure 66 and in the upward direction 36, parallel to the longitudinal axis 38 of the mandrel 22.

The third stage 56 also includes an energy source 70, such as a UV light, which emits electromagnetic radiation toward the outer air-tight transparent material 58 to further cure the first resin-infused fabric material 42. In one embodiment, the energy source 70 is either directly coupled to the guide 64 and moves about the mandrel 22, or is coupled to the vertical structure 66 and moves about the mandrel 22 in conjunction with the vertical structure 66. The energy emitted by the energy source 70 may comprise any suitable wavelengths and power sufficient to at least partially cure the first resin-infused fabric material 42. In some embodiments, the energy source 70 emits energy in a wavelength within the range of about 380-410 nanometers and fully cures the first resin-infused fabric material 42.

Among other advantages, the inner air-tight material 24 and the outer air-tight transparent material 58 provide an air-free environment for curing the first resin-infused fabric material 42, and protects against corrosion and, in an ocean application, sea water degradation.

In some embodiments, the mechanism 14 may include additional stages, such as an inspection stage 72 where the hollow cylinder 16 may be continuously inspected as the hollow cylinder 16 is being generated. The inspection stage 72 may include inspection via individuals, as well as via automated inspection equipment, such as, by way of non-limiting example, an X-ray apparatus 74 and/or an ultrasonic apparatus 76.

Figure 2:
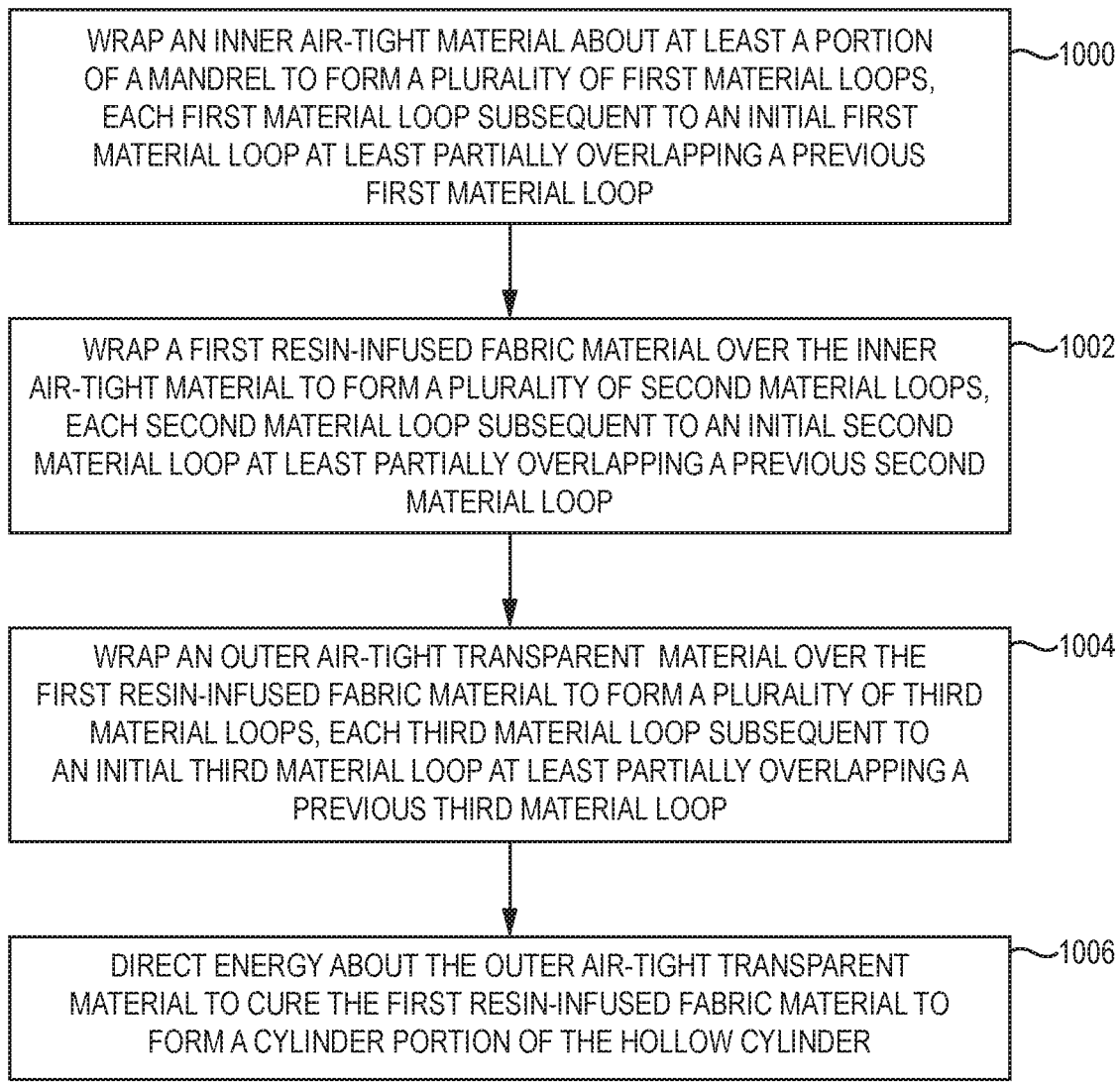
FIG. 2 is flowchart of a method of making the hollow cylinder illustrated in FIG. 1 according to one embodiment.

FIG. 2 is flowchart of a method of making the hollow cylinder 16 according to one embodiment. FIG. 2 will be discussed in conjunction with FIG. 1. The inner air-tight material 24 is wrapped about at least a portion of the mandrel 22 to form the plurality of first material loops 26. Each first material loop 26 subsequent to an initial first material loop 26 at least partially overlaps a previous first material loop 26 (FIG. 2, block 1,000). The first resin-infused fabric material 42 is wrapped over the inner air-tight material 24 to form the plurality of second material loops 46. Each second material loop 46 subsequent to an initial second material loop 46 at least partially overlaps a previous second material loop 46 (FIG. 2, block 1002).

The outer air-tight transparent material 58 is wrapped over the first resin-infused fabric material 42 to form the plurality of third material loops 62. Each third material loop 62 subsequent to an initial third material loop 62 at least partially overlaps a previous third material loop 62 (FIG. 2, block 1004). Energy is directed about the outer air-tight transparent material 58 to cure the first resin-infused fabric material 42 to form a cylinder portion of the hollow cylinder 16 (FIG. 2, block 1006).

Figure 3:
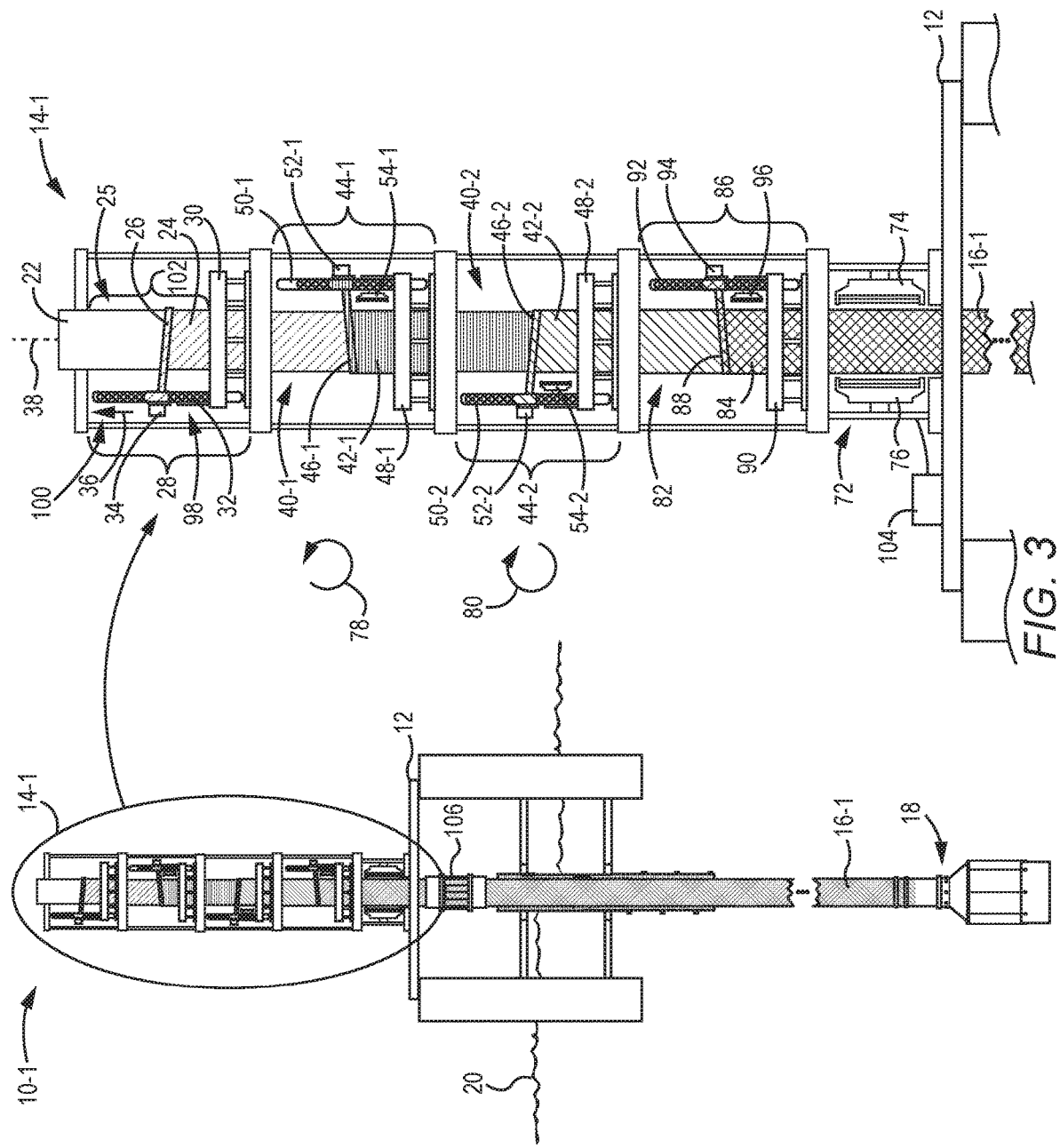
FIG. 3 is a diagram of an environment that includes the deep water platform and a mechanism for generating a multiple layer hollow cylinder according to another embodiment.

FIG. 3 is a diagram of an environment 10-1 that includes the deep water platform 12 and a mechanism 14-1 for generating a multiple layer hollow cylinder 16-1 according to another embodiment. The environment 10-1 and the mechanism 14-1 are substantially similar to the environment 10 and the mechanism 14 discussed above with regard to FIG. 2, except as otherwise discussed herein. In this example, the hollow cylinder 16-1 comprises four layers of material. The first layer comprises the inner air-tight material 24 as discussed above with regard to FIG. 1. At a second stage 40-1 of the mechanism 14-1, a second layer comprising a first resin-infused fabric material 42-1 is wrapped over the inner air-tight material 24. The first resin-infused fabric material 42-1 may be substantially similar or identical to the first resin-infused fabric material 42 discussed above with regard to FIG. 1. A second wrapping mechanism 44-1 wraps the first resin-infused fabric material 42-1 over the inner air-tight material 24 to form a plurality of second material loops 46-1, each second material loop 46-1 after the initial second material loop 46-1 overlapping a previous second material loop 46-1. The second wrapping mechanism 44-1 includes a guide 48-1 and a vertical structure 50-1 movably coupled to the guide 48-1 to facilitate movement of the vertical structure 50-1 completely about the mandrel 22. As a vertical structure 32-1 moves about the mandrel 22, a second material dispenser 52-1 dispenses the first resin-infused fabric material 42-1 while concurrently moving in a rotational direction about the mandrel 22 in conjunction with the vertical structure 50-1 and in the upward direction 36, parallel to the longitudinal axis 38 of the mandrel 22. In this embodiment, the second wrapping mechanism 44-1 wraps the first resin-infused fabric material 42-1 in a first rotational direction 78 about the mandrel 22.

The second stage 40-1 includes an energy source 54-1, such as a UV light, that emits electromagnetic radiation toward the first resin-infused fabric material 42-1 to at least partially cure the first resin-infused fabric material 42-1. The energy emitted by the energy source 54 may comprise any suitable wavelengths and power sufficient to at least partially cure the first resin-infused fabric material 42-1.

At a third stage 40-2 of the mechanism 14-1, a third layer comprising a second resin-infused fabric material 42-2 is wrapped over the inner air-tight material 24 on top of the first resin-infused fabric material 42-1. The second resin-infused fabric material 42-2 may be substantially similar or identical to the first resin-infused fabric material 42-1. Alternatively, the second resin-infused fabric material 42-2 may differ from the first resin-infused fabric material 42-1. For example, the first resin-infused fabric material 42-1 may comprise a fibrous material wherein the fibers are oriented in a particular direction to provide strength to the hollow cylinder 16-1 for certain forces that may act upon the hollow cylinder 16-1 when in operation. The second resin-infused fabric material 42-2 may comprise a fibrous material wherein the fibers are oriented in a different direction to provide strength to hollow cylinder 16-1 for other forces that may act upon the hollow cylinder 16-1 when in operation. While for purposes of illustration only two layers of resin-infused fabric material 42-1, 42-2 are illustrated, in other embodiments any number of layers of resin-infused fabric material 42 may be used.

A third wrapping mechanism 44-2 wraps the second resin-infused fabric material 42-2 on top of the first resin-infused fabric material 42-1 and over the inner air-tight material 24 to form a plurality of third material loops 46-2, each third material loop 46-2 after the initial third material loop 46-2 overlapping a previous third material loop 46-2. The third wrapping mechanism 44-2 includes a guide 48-2 and a vertical structure 50-2 movably coupled to the guide 48-2 to facilitate movement of the vertical structure 50-2 completely about the mandrel 22. As the vertical structure 50-2 moves about the mandrel 22, a third material dispenser 52-2 dispenses the second resin-infused fabric material 42-2 while concurrently moving in a rotational direction about the mandrel 22 in conjunction with the vertical structure 50-2 and in the upward direction 36, parallel to the longitudinal axis 38 of the mandrel 22. In this embodiment, the third wrapping mechanism 44-2 wraps the second resin-infused fabric material 42-2 in a second rotational direction 80 about the mandrel 22 that is the opposite rotational direction from the first rotational direction 78. Among other advantages, this may result in a truly symmetric CWP.

The third stage 40-2 includes an energy source 54-2, such as a UV light, that emits electromagnetic radiation toward the second resin-infused fabric material 42-2 to at least partially cure the second resin-infused fabric material 42-2. In one embodiment, the energy source 54-2 is either directly coupled to the guide 48-2 and moves about the mandrel 22, or is coupled to the vertical structure 50-2 and moves about the mandrel 22 in conjunction with the vertical structure 50-2. The energy emitted by the energy source 54-2 may comprise any suitable wavelengths and power sufficient to at least partially cure the second resin-infused fabric material 42-2. In some embodiments, the energy source 54-2 emits energy in a wavelength within the range of about 380-410 nanometers. The energy source 54-2 may not entirely cure the second resin-infused fabric material 42-2 but at least partially cures the second resin-infused fabric material 42-2.

At a fourth stage 82 of the mechanism 14-1, a fourth layer comprising an outer air-tight transparent material 84 is wrapped over the first resin-infused fabric material 42-1, on top of the second resin-infused fabric material 42-2. The outer air-tight transparent material 84 is transparent to and does not degrade due to UV energy. A fourth wrapping mechanism 86 wraps the outer air-tight transparent material 84 over the first resin-infused fabric material 42-1 to form a plurality of fourth material loops 88, each material loop 88 after the initial material loop 88 overlapping a previous material loop 88. The fourth wrapping mechanism 86 includes a guide 90 and a vertical structure 92 movably coupled to the guide 90 to facilitate movement of the vertical structure 92 completely about the mandrel 22. As the vertical structure 92 moves about the mandrel 22, a fourth material dispenser 94 dispenses the outer air-tight transparent material 84 while concurrently moving in a rotational direction about the mandrel 22 in conjunction with the vertical structure 92 and in the upward direction 36, parallel to the longitudinal axis 38 of the mandrel 22.

The fourth stage 82 also includes an energy source 96, such as a UV light, that emits electromagnetic radiation toward the outer air-tight transparent material 84 to cure the first resin-infused fabric material 42-1 and the second resin-infused fabric material 42-2. In one embodiment, the energy source 96 is either directly coupled to the guide 90 and moves about the mandrel 22 or is coupled to the vertical structure 92 and moves about the mandrel 22 in conjunction with the vertical structure 92.

The mechanism 14-1 may also include additional stages, such as the inspection stage 72 where the hollow cylinder 16-1 may be continuously inspected as the hollow cylinder 16-1 is being generated. The inspection stage 72 may include inspection via individuals, as well as via automated inspection equipment, such as, by way of non-limiting example, the X-ray apparatus 74 and/or the ultrasonic apparatus 76.

In the environment 10-1, the mechanism 14-1 generates the hollow cylinder 16-1 in a series of iterations. The iterations will be described with regard to the first stage 25. Initially, the first material dispenser 34 is at a beginning location 98. The vertical structure 32 begins to move about the mandrel 22 at a first rate, and the first material dispenser 34 dispenses the inner air-tight material 24 while concurrently moving in a rotational direction about the mandrel 22 in conjunction with the vertical structure 32 and in the upward direction 36, upwardly and parallel to the longitudinal axis 38 of the mandrel 22. When the first material dispenser 34 reaches an end location 100 near a top of the vertical structure 32, the vertical structure 32 and the first material dispenser 34 stop. At this point, at least for the first stage 25, a pipe wall portion 102 comprising only the inner air-tight material 24 has been formed on the mandrel 22. The pipe wall portion 102 is slid on the mandrel 22 in a downward direction concurrently while moving the first material dispenser 34 in the downward direction. When the first material dispenser 34 reaches the beginning location 98, the movement of the pipe wall portion 102 and the first material dispenser 34 is halted. The vertical structure 32 can then again begin to move about the mandrel 22 at the first rate, and the first material dispenser 34 dispenses the inner air-tight material 24 while concurrently moving in a rotational direction about the mandrel 22 in conjunction with the vertical structure 32 and in the upward direction 36, upwardly and parallel to the longitudinal axis 38 of the mandrel 22. This process may be repeated hundreds or thousands of times until the hollow cylinder 16-1 is of a desired length.

Note that similar processing occurs with regard to the stages 40-1, 40-2, and 82. Thus, the vertical structures 32, 50-1, 50-2, and 92 may all be initiated concurrently with one another to move about the mandrel 22, and halted concurrently when the respective material dispensers 34, 52-1, 52-2, and 94 reach their respective end locations on the vertical structures 32, 50-1, 50-2, and 92. The respective pipe segments may then be slid down the mandrel 22 and the material dispensers 34, 52-1, 52-2, and 94 moved down the vertical structures 32, 50-1, 50-2, and 92 until the material dispensers 34, 52-1, 52-2, and 94 reach their respective begin locations.

In one embodiment, this controlled sequence of movements may be controlled by a controller 104 that is communicatively coupled to the wrapping mechanisms 28, 44-1, 44-2, and 86 and a gripper 106. The controller 104 may include, for example, a memory and a processing device that executes instructions that implement the functionality discussed herein. The gripper 106 will be discussed in greater detail with regard to FIGS. 4A and 4B, but, generally, the controller 104 controls the gripper 106 to, upon command, move the hollow cylinder 16-1 in the downward direction a particular distance, and to otherwise inhibit movement of the hollow cylinder 16-1 in the downward direction.

Figure 4A:
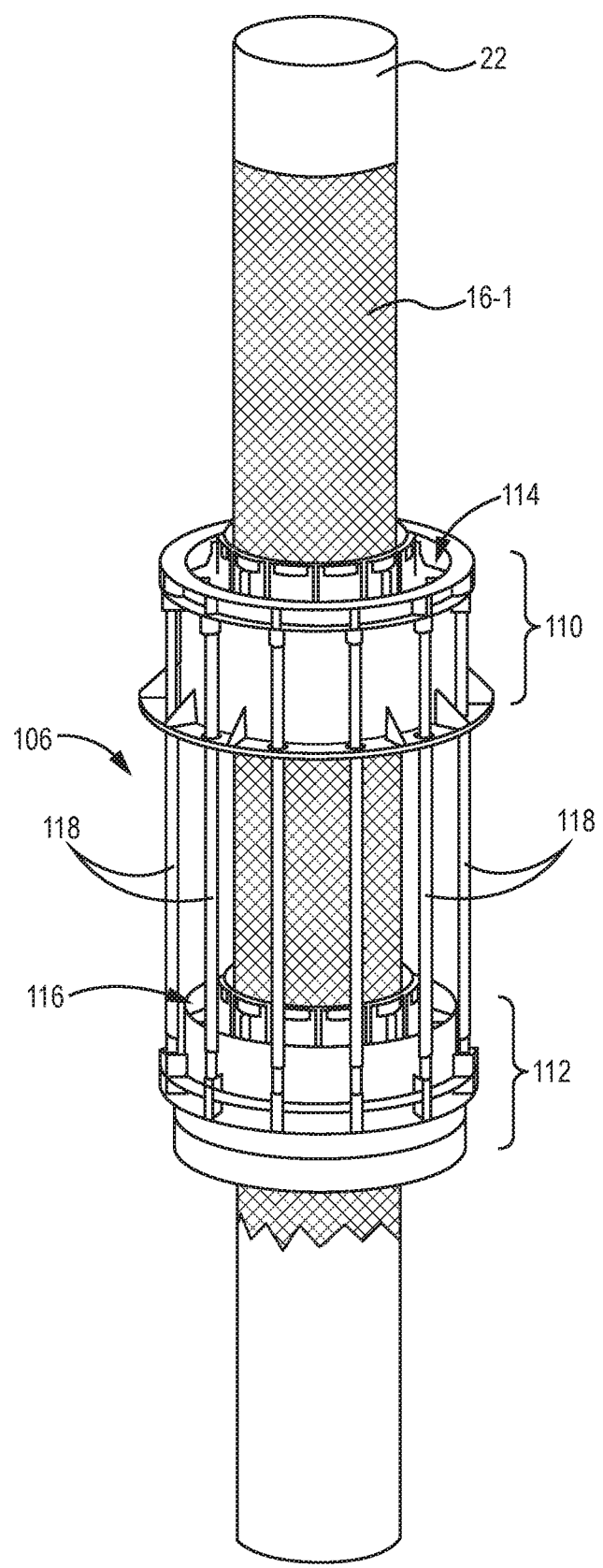
FIG. 4A illustrates a gripper illustrated in FIG. 3 in a retracted position according to one embodiment.

FIG. 4A illustrates the gripper 106 in a retracted position according to one embodiment. The platform 12 and mechanisms 14, 14-1 (FIGS. 1 and 3) are omitted for purposes of illustration, but, in operation, the gripper 106 would be coupled to the platform 12 under the mechanisms 14, 14-1, or an alternative mechanism, that generate the hollow cylinder 16-1. The gripper 106 thus receives the hollow cylinder 16-1 as the hollow cylinder 16-1 is generated. The gripper 106 includes a top collar 110 and a bottom collar 112. The top collar 110 comprises a top grip mechanism 114 that is configured to at least partially surround the hollow cylinder 16-1. The top grip mechanism 114 may be controlled to move inwards toward and contact the hollow cylinder 16-1 to grip the hollow cylinder 16-1 to inhibit vertical movement of the hollow cylinder 16-1. The top grip mechanism 114 may also be controlled to move outwards away from the hollow cylinder 16-1 to allow vertical movement of the hollow cylinder 16-1. The top collar 110 may be fixed with respect to the platform 12.

Similarly, the bottom collar 112 comprises a bottom grip mechanism 116 that is configured to at least partially surround the hollow cylinder 16-1. The bottom grip mechanism 116 may be controlled to move inwards toward and contact the hollow cylinder 16-1 to grip the hollow cylinder 16-1 to inhibit vertical movement of the hollow cylinder 16-1. The bottom grip mechanism 116 may also be controlled to move outwards away from the hollow cylinder 16-1 to allow vertical movement of the hollow cylinder 16-1.

Figure 4B:
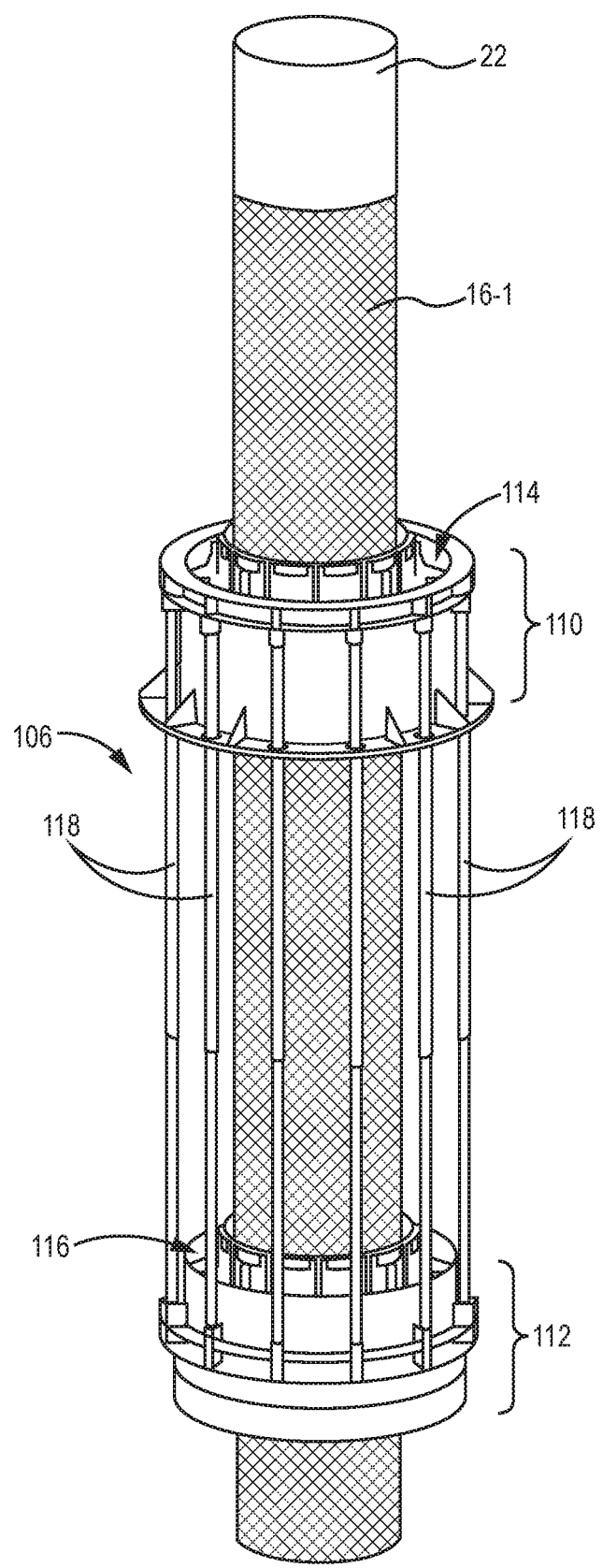
FIG. 4B illustrates the gripper illustrated in FIG. 4A in an extended position according to one embodiment.

The gripper 106 includes a plurality of hydraulic telescoping shafts 118 that control vertical movement of the bottom collar 112 with respect to the top collar 110. In one example, the controller 104 (FIG. 3) controls the gripper 106 to move the hollow cylinder 16-1 in a downward direction by signaling the bottom grip mechanism 116 to grip the hollow cylinder 16-1, signaling the top grip mechanism 114 to release the hollow cylinder 16-1, and signaling the gripper 106 to extend the telescoping shafts 118 a predetermined distance. FIG. 4B illustrates the gripper 106 in an extended position. As the telescoping shafts 118 move the bottom collar 112 downward, the hollow cylinder 16-1, gripped by the bottom grip mechanism 116, is pulled downward. After the telescoping shafts 118 have moved the desired distance and stopped, the top grip mechanism 114 may be signaled to grip the hollow cylinder 16-1, and the bottom grip mechanism 116 may be signaled to release the hollow cylinder 16-1. The gripper 106 may then be signaled to retract the telescoping shafts 118 to return the bottom grip mechanism 116 to the retracted position illustrated in FIG. 4A. The bottom grip mechanism 116 may then be signaled to grip the hollow cylinder 16-1 such that both the top grip mechanism 114 and the bottom grip mechanism 116 grip the hollow cylinder 16-1.

Figure 5:
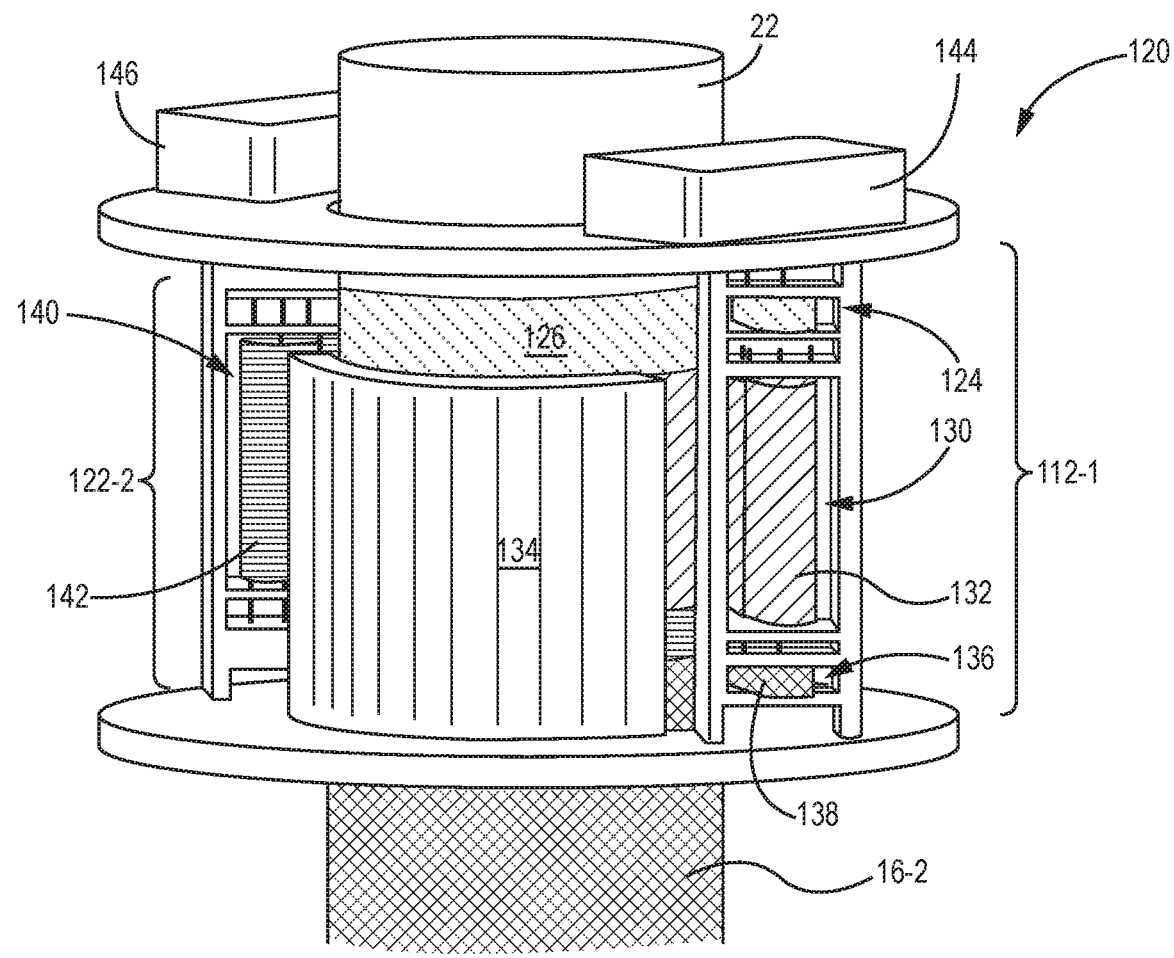
FIG. 5 is a diagram of a mechanism suitable for generating a hollow cylinder according to another embodiment.

FIG. 5 is a diagram of a mechanism 120 suitable for generating a hollow cylinder 16-2, according to another embodiment. The mechanism 120 comprises a turntable that rotates about the mandrel 22 while generating a hollow cylinder 16-2. In this embodiment, the mechanism 120 rotates but does not move in a direction along a longitudinal axis of the mandrel 22. Instead, the gripper 106 (FIGS. 4A, 4B) slowly moves the hollow cylinder 16-2 in a downward direction as the mechanism 120 rotates about the mandrel 22. In particular, the mechanism 120 may include a first material dispensing system 122-1 and, in some embodiments, a second material dispensing system 122-2. The first material dispensing system 122 dispenses three layers of materials about the mandrel 22 to form the hollow cylinder 16-2 as the hollow cylinder 16-2 is continually moved in a direction parallel to the longitudinal axis 38 of the mandrel 22. The first material dispensing system 122-1 includes an inner air-tight material dispenser 124 that dispenses an inner air-tight material 126 that is transparent to UV energy, does not degrade due to UV energy, and has a low coefficient of friction to enable the inner air-tight material 126 to slide with respect to the mandrel 22 relatively easily. The inner air-tight material 126 may be substantially similar to or identical to the inner air-tight material 24 discussed above with regard to FIG. 1. As the mechanism 120 rotates about the mandrel 22, the inner air-tight material 126 is wrapped about a portion of the mandrel 22 to form a plurality of first material loops, each material loop after the initial material loop overlapping a previous material loop.

The first material dispensing system 122-1 also includes a first resin-infused fabric material dispenser 130 that dispenses a first resin-infused fabric material 132. The first resin-infused fabric material 132 may be substantially similar to or identical to the first resin-infused fabric material 42 discussed above with regard to FIG. 1. As the mechanism 120 rotates about the mandrel 22, the first resin-infused fabric material 132 is wrapped over the inner air-tight material 126 to form a plurality of second material loops, each second material loop after the initial second material loop overlapping a previous second material loop.

The mechanism 120 includes one or two energy sources 134, such as UV light, which emits electromagnetic radiation toward the first resin-infused fabric material 132 to at least partially cure the first resin-infused fabric material 132. The energy source 134 may have similar or identical characteristics to the energy source 54 discussed above.

The first material dispensing system 122-1 also includes an outer air-tight transparent material dispenser 136 that dispenses an outer air-tight transparent material 138 that is transparent to UV energy and does not degrade due to UV energy. The outer air-tight transparent material 138 may be substantially similar to or identical to the outer air-tight transparent material 58 discussed above with regard to FIG. 1. As the mechanism 120 rotates about the mandrel 22, the outer air-tight transparent material 138 is wrapped over the first resin-infused fabric material 132 to form a plurality of third material loops, each third material loop after the initial third material loop overlapping a previous third material loop.

In some embodiments, a second material dispensing system 122-2 may be used to concurrently dispense material concurrently with the first material dispensing system 122-1. In this example, the second material dispensing system 122-2 includes a second resin-infused fabric material dispenser 140 that dispenses a second resin-infused fabric material 142. The second resin-infused fabric material 142 may be substantially similar to or identical to the second resin-infused fabric material 42-2 discussed above with regard to FIG. 3. The second resin-infused fabric material 142 is dispensed on top of the first resin-infused fabric material 132.

In one example, the first material dispensing system 122-1 includes a first resin tank 144 that contains resin that is infused in the first resin-infused fabric material 132 as the first resin-infused fabric material 132 is wrapped over the inner air-tight material 126. In other embodiments, a pre-impregnated first resin-infused fabric material 132 may be used. Similarly, a second resin tank 146 that contains resin can be used to infuse the second resin-infused fabric material 142 with resin as the second resin-infused fabric material 142 is wrapped about the mandrel 22. In other embodiments, a pre-impregnated second resin-infused fabric material 142 may be used.

Figure 6:
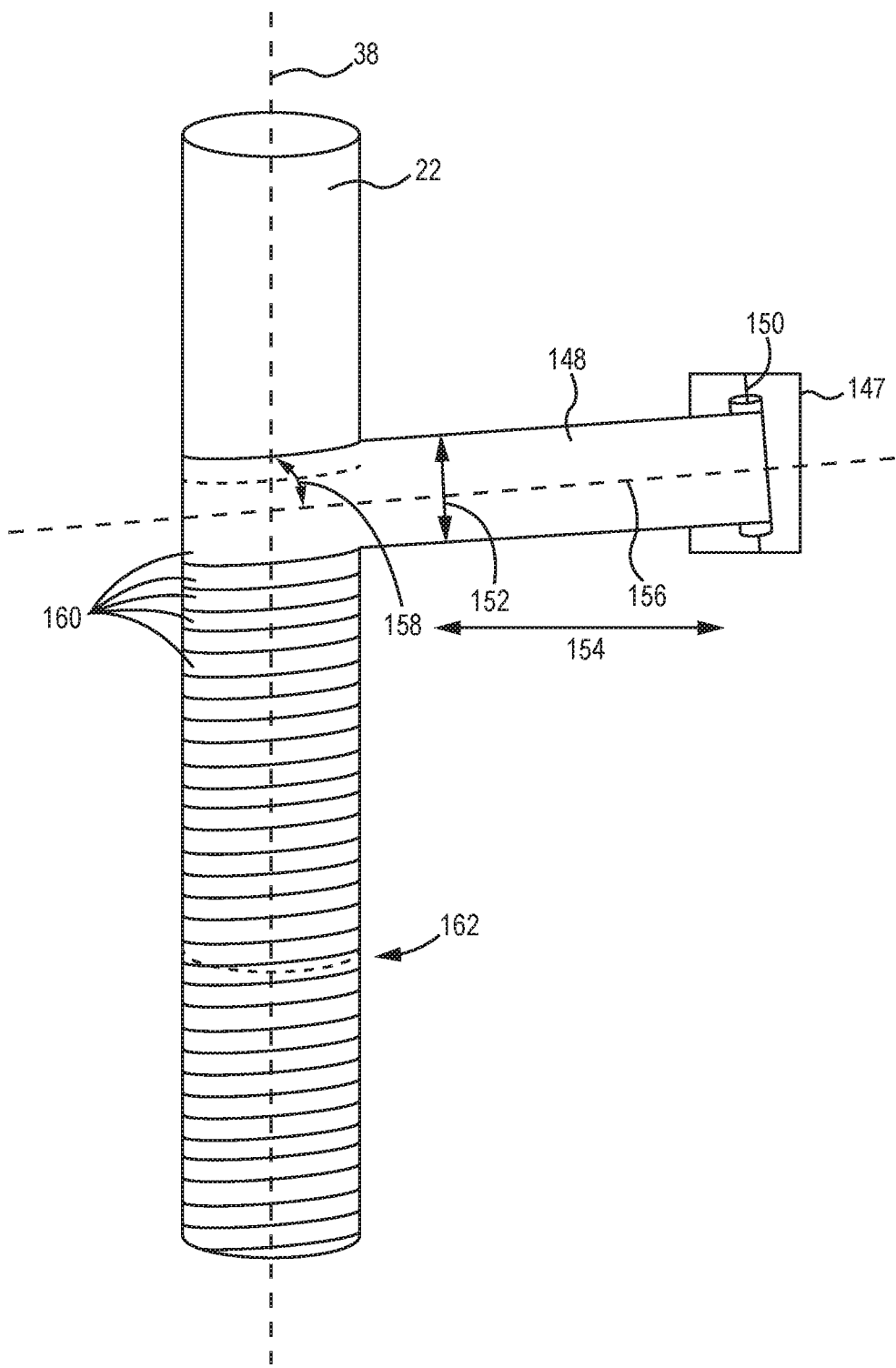
FIG. 6 is a diagram illustrating aspects of wrapping a material about a mandrel according to one embodiment.

FIG. 6 is a diagram illustrating aspects of wrapping a material about the mandrel 22 according to one embodiment. In this example, a material dispenser 147 dispenses a material 148 about the mandrel 22. The material dispenser 147 includes an axis 150 that may be non-parallel with respect to the longitudinal axis 38 of the mandrel 22. The material 148 has a width 152 and a length 154. A line 156 that extends down the center lengthwise of the material 148 is at a non-perpendicular angle 158 with respect to the longitudinal axis 38. In one example, the non-perpendicular angle 158 is about 89 degrees.

In some embodiments, each material loop 160 of the material 148 substantially overlaps each previous material loop 160. Generally, the discussion herein with regard to FIG. 6 may apply to any of the materials discussed herein with regard to FIGS. 1-5. In one example with respect to a resin-infused fabric material, such as the first resin-infused fabric material 42, the material 148 has a width 152 of 100 inches and is 0.10 inches thick, and each material loop 160 overlaps about 96 inches of a previous material loop 160. In one embodiment wherein the interior diameter of the hollow cylinder is 4 meters, the material 148 is wrapped at a rate of about 40 degrees a minute (55 inches/minute) about the mandrel 22. As discussed above with regard to FIGS. 3 and 5, multiple resin-infused fabric materials may be concurrently wrapped about the mandrel 22 to arrive at a desired thickness of the mandrel 22. As discussed above, as the hollow cylinder is generated, it is slipped down the mandrel 22 past an end 162 of the mandrel 22.

Those skilled in the art will recognize improvements and modifications to the preferred embodiments of the disclosure. All such improvements and modifications are considered within the scope of the concepts disclosed herein and the claims that follow.

What is claimed is:

1. A method of making a hollow cylinder comprising:
   wrapping an inner air-tight material around at least a portion of a mandrel to form a plurality of first material loops, each first material loop that is subsequent to an initial first material loop at least partially overlaps a previous first material loop;
   maintaining the mandrel in a vertical orientation over an opening in a platform positioned in water having a depth in excess of 1,000 meters while wrapping the inner air-tight material around the at least the portion of the mandrel;
   wrapping a first resin-infused fabric material over the inner air-tight material to form a plurality of second material loops, each second material loop that is subsequent to an initial second material loop at least partially overlaps a previous second material loop;
   wrapping an outer air-tight transparent material over the first resin-infused fabric material to form a plurality of third material loops, each third material loop that is subsequent to an initial third material loop at least partially overlaps a previous third material loop; and
   directing ultraviolet energy around the outer air-tight transparent material to transmit through the outer air-tight transparent material to cure the first resin-infused fabric material to form a cylinder portion of the hollow cylinder.

2. The method of claim 1 further comprising directing energy around the first resin-infused fabric material prior to wrapping the outer air-tight transparent material over the first resin-infused fabric material.

3. The method of claim 1 further comprising wrapping a second resin-infused fabric material over the first resin-infused fabric material to form a plurality of fourth material loops, each fourth material loop that is subsequent to an initial fourth material loop at least partially overlaps a previous fourth material loop.

4. The method of claim 3 further comprising directing energy around the second resin-infused fabric material prior to wrapping the outer air-tight transparent material over the first resin-infused fabric material and the second resin-infused fabric material.

5. The method of claim 3 wherein wrapping the second resin-infused fabric material over the first resin-infused fabric material to form the plurality of fourth material loops further comprises wrapping the second resin-infused fabric material over the first resin-infused fabric material in an opposite rotational direction around the mandrel than a rotational direction that the first resin-infused fabric material was wrapped to form the plurality of fourth material loops, each fourth material loop that is subsequent to the initial fourth material loop at least partially overlaps the previous fourth material loop.

6. The method of claim 1 further comprising sliding the cylinder portion with respect to the mandrel in a direction toward an end of the mandrel.

7. The method of claim 6 wherein sliding the cylinder portion with respect to the mandrel in the direction toward the end of the mandrel comprises continuously sliding the cylinder portion with respect to the mandrel in the direction toward the end of the mandrel while concurrently wrapping the inner air-tight material around the at least the portion of the mandrel to form at least some of the plurality of first material loops.

8. The method of claim 7 wherein continuously sliding the cylinder portion with respect to the mandrel in the direction toward the end of the mandrel further comprises continuously sliding the cylinder portion with respect to the mandrel in a downward direction toward the end of the mandrel.

9. The method of claim 6 wherein wrapping the inner air-tight material around the at least the portion of the mandrel to form the plurality of first material loops further comprises:
   wrapping, via a first material dispenser that concurrently moves in a first rotational direction around a perimeter of the mandrel and in a second direction along a longitudinal axis of the mandrel, the inner air-tight material around the mandrel to form the plurality of first material loops.

10. The method of claim 9 wherein sliding the cylinder portion with respect to the mandrel in the direction toward the end of the mandrel further comprises iteratively:
    concurrently halting the wrapping of the inner air-tight material around the at least the portion of the mandrel, the wrapping of the first resin-infused fabric material over the inner air-tight material, and the wrapping of the outer air-tight transparent material over the first resin-infused fabric material;
    sliding the cylinder portion with respect to the mandrel in the direction toward the end of the mandrel a predetermined distance; and
    concurrently initiating the wrapping of the inner air-tight material around the at least the portion of the mandrel, the wrapping of the first resin-infused fabric material over the inner air-tight material, and the wrapping of the outer air-tight transparent material over the first resin-infused fabric material.

11. The method of claim 10 wherein sliding the cylinder portion with respect to the mandrel in the direction toward the end of the mandrel the predetermined distance further comprises concurrently sliding the cylinder portion with respect to the mandrel in the direction toward the end of the mandrel the predetermined distance while moving the first material dispenser with respect to the mandrel in the direction toward the end of the mandrel.

12. The method of claim 1 wherein the mandrel comprises a chrome plated surface with a non-stick coating that results in coefficients of both static and kinetic friction below 0.1.

13. The method of claim 1 wherein the outer air-tight transparent material is transparent to ultraviolet energy in a range of wavelengths between about 380 nanometers and about 410 nanometers.

\* \* \* \* \*